United States Patent
Bührlen et al.

(10) Patent No.: US 7,661,699 B2
(45) Date of Patent: Feb. 16, 2010

(54) AIRBAG SYSTEM

(75) Inventors: Karl-Heinz Bührlen, Ulm-Donaustetten (DE); Reiner Söll, Berghülen (DE); Martin Späth, Dornstadt (DE); Holger Rist, Dornstadt (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/155,112

(22) Filed: May 29, 2008

(65) Prior Publication Data

US 2008/0309055 A1   Dec. 18, 2008

Related U.S. Application Data

(63) Continuation of application No. PCT/EP2005/013049, filed on Dec. 1, 2005.

(51) Int. Cl.
*B60R 21/20* (2006.01)
(52) U.S. Cl. ...................................... 280/729
(58) Field of Classification Search .................. 280/729, 280/730.2, 740, 742
See application file for complete search history.

(56) References Cited

U.S. PATENT DOCUMENTS

| | | | |
|---|---|---|---|
| 6,349,964 B1 | 2/2002 | Acker et al. | |
| 6,616,177 B2 | 9/2003 | Thomas et al. | |
| 6,802,529 B2 * | 10/2004 | Takedomi et al. | 280/729 |
| 7,021,652 B2 * | 4/2006 | Kumagai et al. | 280/729 |
| 7,278,656 B1 * | 10/2007 | Kalandek | 280/730.2 |
| 7,422,235 B2 * | 9/2008 | Wollin et al. | 280/730.2 |
| 2003/0141710 A1 | 7/2003 | Zahn et al. | |
| 2004/0104563 A1 | 6/2004 | Fischer | |
| 2004/0188987 A1 | 9/2004 | Salmo et al. | |
| 2005/0062266 A1 * | 3/2005 | Steimke et al. | 280/730.2 |
| 2006/0061075 A1 | 3/2006 | Aoki et al. | |
| 2006/0103119 A1 * | 5/2006 | Kurimoto et al. | 280/730.2 |
| 2007/0182135 A1 * | 8/2007 | Kai et al. | 280/730.2 |
| 2007/0228701 A1 * | 10/2007 | Yamamura | 280/730.2 |

FOREIGN PATENT DOCUMENTS

| | | |
|---|---|---|
| DE | 200 03 652 U1 | 5/2000 |
| DE | 10 2005 045 370 A1 | 4/2006 |
| EP | 1 462 321 A1 | 9/2004 |
| JP | 2000-177527 | 6/2000 |
| JP | 2005225351 A * | 8/2005 |
| WO | WO 99/42340 | 8/1999 |
| WO | WO 99/59845 | 11/1999 |

* cited by examiner

*Primary Examiner*—Paul N Dickson
*Assistant Examiner*—Robert A Coker
(74) *Attorney, Agent, or Firm*—Foley & Lardner LLP

(57) ABSTRACT

An airbag system for a motor vehicle including a gas bag having first and second chambers. The system includes an inflator and a arranged in the connecting portion so that gas is guided into both the first and second chambers. The system includes at least one protective layer extending from the mass flow divider into the first chamber. Upon inflation of the gasbag, an inner pressure in the first chamber is significantly higher than an inner pressure in the second chamber, and wherein the protective layer comprises a flexible material deformed by the inner pressure in the first chamber to prevent gas from flowing from the first chamber through the connecting portion into the second chamber.

34 Claims, 4 Drawing Sheets

AIRBAG SYSTEM

CROSS-REFERENCE TO RELATED APPLICATIONS

This application is a Continuation of International Application No. PCT/EP2005/013049, filed Dec. 1, 2005, which was published in German as WO 2007/062681 and is incorporated herein by reference in its entirety.

BACKGROUND

The present application relates to an airbag system (e.g. an airbag module) for protecting an occupant in a motor vehicle such as a car in an event of a car crash. More particularly, the present application relates to an airbag system including a gasbag that is partitioned into at least a first and a second chamber connected to each other along a connecting portion. In such airbag systems, an inflator inflates the gasbag towards an occupant and the inflated gasbag receives the body of the occupant in an event of a car crash.

SUMMARY

One disclosed embodiment relates to an airbag system for a motor vehicle. The airbag system includes an inflatable gasbag having at least a first and a second chamber connected to each other along a connecting portion, an inflator for inflating the first and second chambers of the gasbag, and a mass flow divider associated with the inflator and arranged in the connecting portion of the gasbag. Gas ejected by the inflator is guided into both the first and second chambers of the gasbag by the mass flow divider. At least one protective layer extends from the mass flow divider into the first chamber to protect at least a portion of a covering of the first chamber from the gas guided into the first chamber by the mass flow divider. Upon inflation of the gasbag, an inner pressure in the first chamber is significantly higher than an inner pressure in the second chamber. The protective layer includes a flexible material deformed by the inner pressure in the first chamber to prevent gas from flowing from the first chamber through the connecting portion into the second chamber.

BRIEF DESCRIPTION OF THE DRAWINGS

Several embodiments of the present application will be described below with reference to the accompanying drawings, in which.

DETAILED DESCRIPTION

Figure 1:
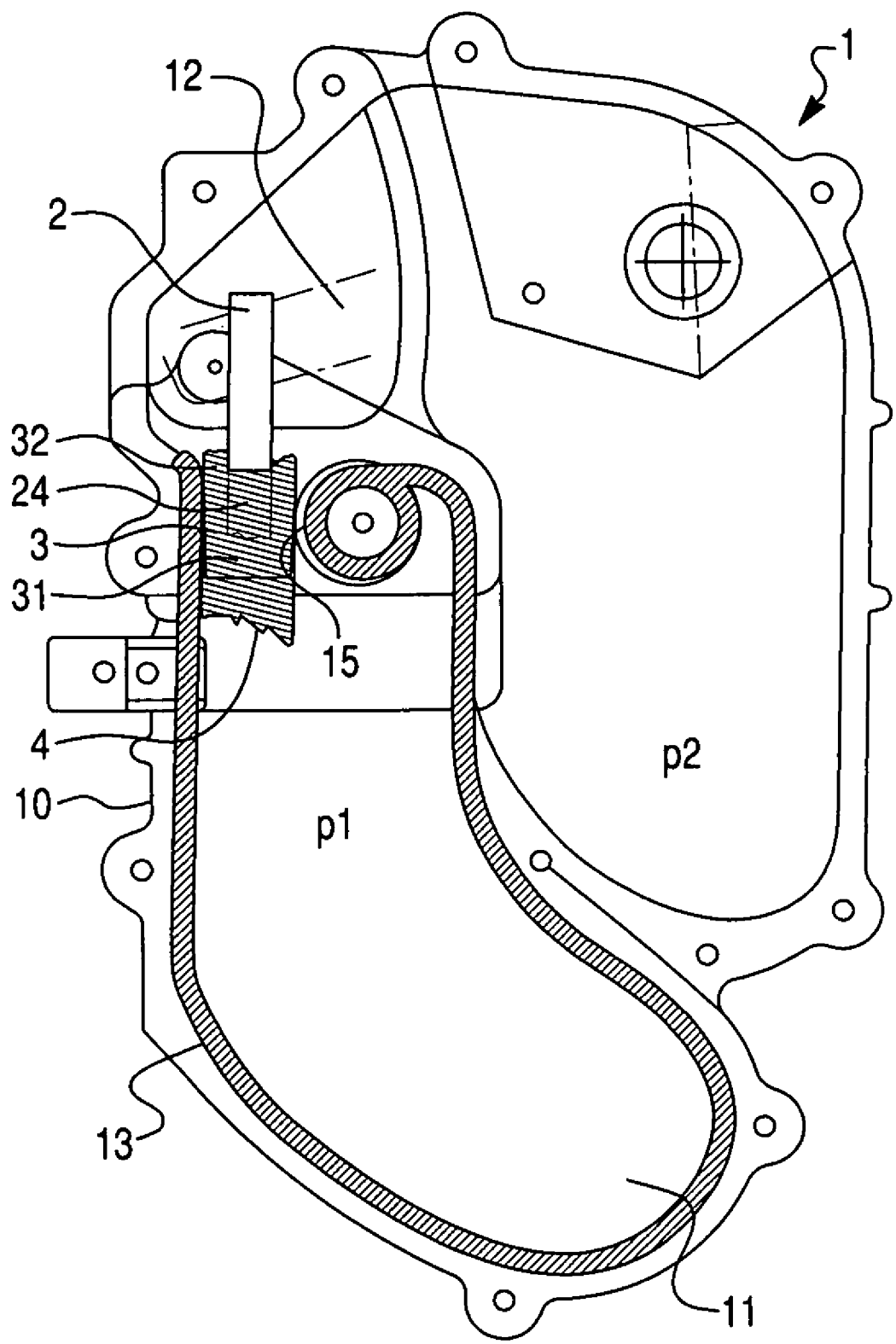
FIG. 1 is a sectional top view of an airbag module comprising a mass flow divider and a protective layer, according to an exemplary embodiment.

According to some exemplary embodiments, the airbag system may be an airbag system similar to the airbag systems disclosed in U.S. Pat. No. 6,802,529 B2 and Japanese patent publication number 2000-177527 (both incorporated by reference herein). To inflate both the first and second chamber of the gasbag, a mass flow divider is associated with the inflator and arranged in the connecting portion of the gasbag so that gas generated and ejected by the inflator is guided into both the first and second chamber of the gasbag.

Typically, the two chambers of a gasbag are inflated to different inner pressures, for example so that the inner pressure of the first chamber is higher than the inner pressure of the second chamber. The inflator and the mass flow divider may be configured in such a way that upon activation of the inflator and inflation of the gasbag, more gas is guided into the first chamber than into the second chamber. Alternatively, the volume or capacity of the first chamber may be smaller than the volume or capacity of the second chamber to allow a higher inner pressure in the first chamber.

Conventionally, the inflation of a chamber of the gasbag to a comparatively high pressure may cause the gas flow into the corresponding chamber to damage parts of the covering of the chamber.

Therefore, according to various other exemplary embodiments, the airbag system may allow a chamber of the gasbag to be inflated to a high pressure without damaging the covering of the gasbag.

According to an exemplary embodiment, at least one protective layer may extend from a mass flow divider associated with the inflator into at least the first chamber of the gasbag. The protective layer may assist the mass flow divider in guiding the gas flow into the first chamber of the gasbag.

According to an exemplary embodiment, the at least one protective layer may be configured to protect the parts of the covering of the first chamber that would otherwise be hit by the gas directed into the first chamber, particularly the parts of the covering adjoining a connecting portion of the gasbag. In other words, the at least one protective layer may prevent the gas emerging from the inflator and guided into the first chamber by the mass flow divider from flowing against certain parts of the covering of the first chamber that could be damaged due to the elevated temperature of the gas generated and ejected by the inflator.

According to another exemplary embodiment, the protective layer may prevents gas emerging from the inflator and guided into the first chamber by the mass flow divider from flowing against parts of a seam that separates the first chamber from other parts of the gasbag.

According to various exemplary embodiments, the mass flow divider may be any assembly associated with or connected to the inflator (gas generator) in such a manner that gas generated and ejected by the gas generator interacts with the mass flow divider. The mass flow divider guides a first part of the gas flow into the first chamber of the gasbag and a second part of the gas flow into at least one additional (second) chamber of the gasbag.

The mass flow divider may include a pipe (e.g., a hollow cylindrical housing) that surrounds at least a part of a rod shaped inflator and in particular parts of the inflator that have gas jet ports through which gas can be ejected by the inflator.

The mass flow divider may have openings through which gas emerging from the inflator is ejected into the first and second chambers of the gasbag.

According to various exemplary embodiments, a higher inner pressure in the first chamber than in the second chamber of the gasbag may be achieved in different ways. According to one exemplary embodiment, the openings through which gas is ejected into the first chamber may have a larger cross-section than the openings associated with the second chamber of the gasbag. According to another exemplary embodiment, the first chamber may be provided with a smaller volume of gas than the second chamber. Additionally or alternatively, the inner pressure of the gasbag chambers can be controlled by forming the chambers with defined leakage rates. According to some exemplary embodiments, the first chamber may be bounded by a sealed seam to generate a high inner pressure within the first chamber.

According to one exemplary embodiment, the rear and the front end of the mass flow divider may be a pipe and may each have at least one opening. One of the openings may be associated with the first chamber and the other opening may be associated with the second chamber of the gasbag. Alternatively or in addition, the openings may be in the jacket of the mass flow divider. The protective layer projecting from the mass flow divider may include a flexible material and can be made of a fabric.

According to another exemplary embodiment, the inner pressure in the first chamber that is produced by gas ejected by the inflator may lead to a deformation of the protective layer so that the protective layer closes the connecting portion of the gasbag (passage between the first and second chamber) and prevents gas from flowing from the first chamber through the connecting portion into the second chamber of the gasbag. The protective layer may act as a valve and can maintain an inner pressure of the first chamber at a higher level than the second chamber for a long period of time.

The protective layer may protect the covering of the gasbag from the gas flow into the first chamber and maintain a difference in the inner pressure of the first chamber of and/or the second chamber.

The portion of the protective layer projecting from the mass flow divider into the first chamber may be a guide element guiding the gas flow into the first chamber, a protective element protecting the covering of the first chamber, and a valve element for avoiding a backflow of gas from the first chamber into the second chamber of the gasbag. The first chamber may be connected to several second chambers that are to be inflated with a lower inner pressure than the first chamber.

Even though the protective layer extends from the mass flow divider into the first chamber, the protective layer does not have to be connected to the mass flow divider. For example, the protective layer may be connected to the inflator and/or the mass flow divider by one or several screws, by one or several clamping elements such as a clamping holder, by one or several rivets or bolts or by any other suitable fastener to connect a flexible element (protective layer) to a more rigid element (component part of the inflator and/or mass flow divider).

The protective layer may be connected to the gasbag, for example to the connecting portion of the gasbag or to a portion of the covering of the first chamber of the gasbag (e.g., by a seam or an adhesive).

The at least one protective layer may be a protective sleeve surrounding the mass flow divider or disposed inside the mass flow divider and may have a U-shaped cross-section or a circular cross-section.

The protective layer may be made of a single flexible layer with opposite sides of the flexible layer being at least partially sewn together. Alternatively, the protective layer may include a plurality of (at least two) flexible layers sewn together to provide a specific design and cross-section.

The interior and/or exterior faces of the at least one protective layer may be provided with a coating.

The area of the mass flow divider from which the at least one protective layer projects/protrudes into the first chamber of the gasbag may be disposed in the first chamber, in the second chamber, or in the connecting portion of the gasbag.

FIG. 1 shows a sectional top view of an airbag system (airbag module) according to one exemplary embodiment. The airbag module includes a gasbag 1 and a rod-shaped inflator 2 for inflating the gasbag 1. The gasbag 1 is partitioned into a first and a second chamber 11, 12. The first chamber is bounded by a seam 13.

The gasbag chambers 11, 12 are connected to each other along a connecting portion 15 of the gasbag 1 forming a passage between the two chambers 11, 12. The inflator 2 is located in the connecting portion 15.

A cylindrical housing 3 partially surrounds the inflator 2 and operates as a mass flow divider. The cylindrical housing 3 is configured and arranged to distribute gas emerging from the inflator 2 into both the first and the second chamber 11, 12 of the gasbag 1 in such a manner that the first chamber 11 is inflated to an inner pressure p1 that is higher than an inner pressure p2 of the second chamber 12. Both opposing ends of the cylindrical housing 3 may include gas outlets 31, 32 (openings) permitting gas to be ejected into the chambers 11, 12. The volume of the first chamber 11 is smaller than the volume of the second chamber 12 and the first chamber is defined by the sealed seam 13. The chamber 11 can be inflated at an inner pressure higher than that of chamber 12.

The cylindrical housing 3 surrounds gas ejection ports 24 of the inflator 2 to divide the gas flow ejected by the inflator 2 into two partial gas flows flowing in opposite directions along the longitudinal axis of the cylindrical housing 3 and towards its gas outlets 31, 32. From the gas outlets 31, 32 of the cylindrical housing 3 gas is ejected into the chambers 11, 12 of the gasbag 1, respectively.

Because of the different volumes of the chambers 11 and 12, the inner pressure p1 of the first chamber 11 is higher than the inner pressure p2 in the second chamber 12 when inflated by the inflator 2.

The cylindrical housing 3 may include an attachment clip (not shown) with a borehole for connection to the inflator 2. A threaded bolt (not shown) may protrude from the inflator 2 through the borehole of the attachment clip and connect the cylindrical housing 3 to the inflator 2.

A flexible protective layer 4 is disposed in the connecting portion 15 of the airbag module extending into the high pressure chamber 11 of the gasbag 1. The protective layer 4 is of a cylindrical shape surrounding the cylindrical housing 3 and a portion of the inflator 2. The protective layer 4 protects a part of the covering 10 of the first chamber 11 adjoining the connecting portion 15 and the seam 13 from gases emerging from the inflator 2 and guided into the first chamber 11 by the cylindrical housing 3.

The protective layer 4 prevents a backflow of gas from the first chamber 11 (high pressure chamber) into the second chamber 12 (low pressure chamber 12) after inflation of the gasbag 1 since the protective layer 4 is deformed by the inner pressure p1 in the first chamber 11 and closes the connecting portion 15 of the gasbag 1.

Figure 2A:
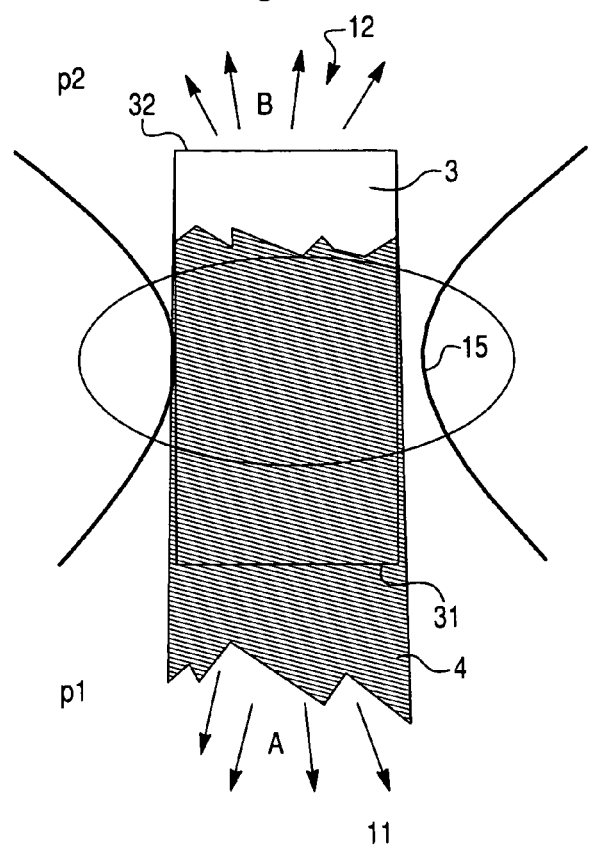
FIG. 2a is a detailed view of a mass flow divider and a protective layer in a first configuration, according to an exemplary embodiment.
Figure 2B:
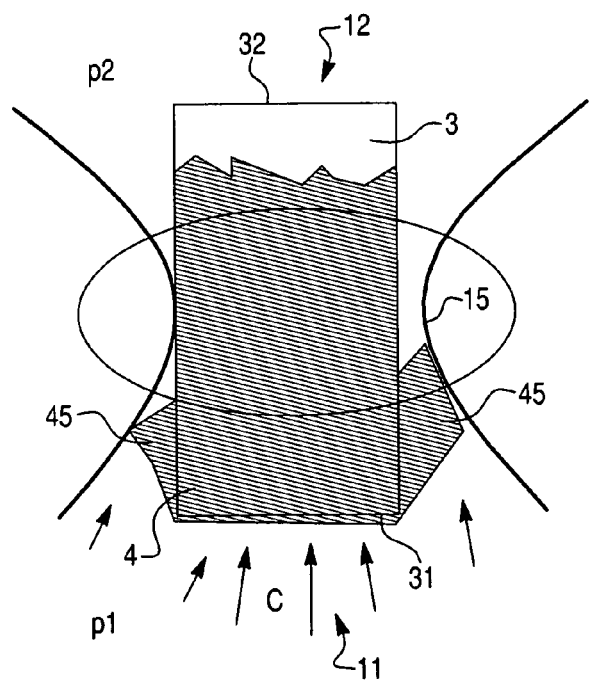
FIG. 2b shows the mass flow divider of FIG. 2a together with a protective layer in a second configuration, according to an exemplary embodiment.

The prevention of a backflow from a high pressure chamber of a gasbag employing a protection layer is illustrated in more detail in FIGS. 2a and 2b. FIG. 2a shows the connecting portion 15 forming a passage between two chambers 11, 12 of a gasbag with different inner pressures p1, p2. The mass flow divider formed by a cylindrical housing 3 is located in the connecting portion 15 and is partially surrounded by the protective layer 4 with a hollow-cylindrical shape.

The cylindrical housing 3 divides the gas ejected by an inflator (not shown) into two gas flows inflating the first chamber 11 and the second chamber 12 of the gasbag, respectively. Each end portion of the cylindrical housing 3 defines a gas outlet 31, 32 such that gas emerging from the inflator is ejected into both chambers 11, 12 through the gas outlets 31, 32 and along a direction indicated by arrows A and B. The gas outlet 31 of the cylindrical housing 3 associated with the first chamber 11 of the gas bag 1 is configured to permit the first chamber 11 to be inflated with an inner pressure p1 that is higher than the inner pressure p2 of the second chamber 12.

A protective layer 4 associated with the cylindrical housing 3 may be made of a flexible material (e.g. a textile fabric). During inflation of the gasbag 1, the portion of the protective layer 4 projecting from the cylindrical housing and extending into the high pressure chamber 11 has an essentially cylindrical shape. Therefore, the protective layer 4 cooperates with the cylindrical housing 3 in guiding gas ejected by an inflator into the first chamber 11.

After inflation of the gasbag, the first chamber 11 is inflated with a higher inner pressure p1 than the second chamber 12 of the gasbag. This pressure difference tends to generate a gas flow (backflow) from the first chamber 11 through the connecting portion 15 of the gasbag into the second chamber 12 (indicated by arrows C), as shown in FIG. 2b. However, due to the increased inner pressure p1 in the first chamber 11 the flexible protective layer 4 is deformed such that the portion 45 of the protective layer 4 projecting from the cylindrical housing 3 into the first chamber 11 is bent backwards, closing the connecting portion 15 of the gasbag. The protective layer 4 thus functions as a check valve.

Figure 3A:
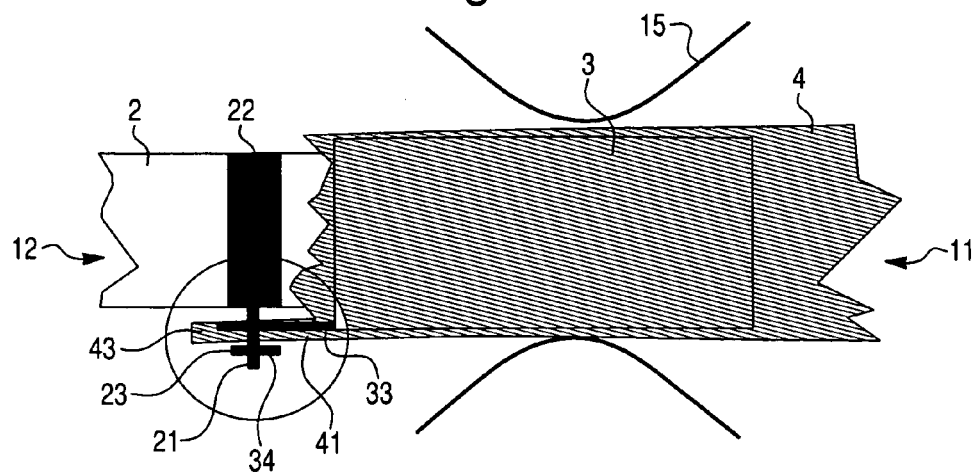
FIG. 3a is a side view of a protective layer connected to an inflator of an airbag module, according to an exemplary embodiment.
Figure 3B:
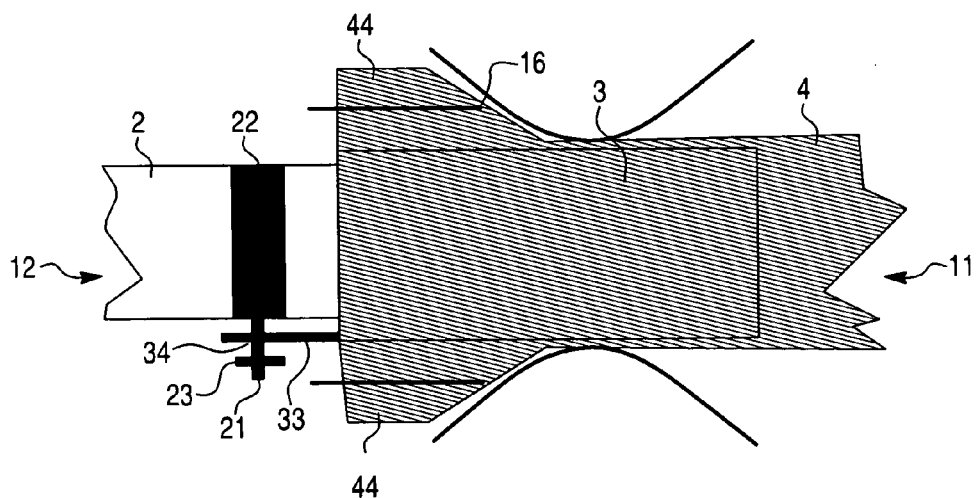
FIG. 3b is a side view of a protective layer connected to a gasbag of an airbag module, according to an exemplary embodiment.
Figure 3C:
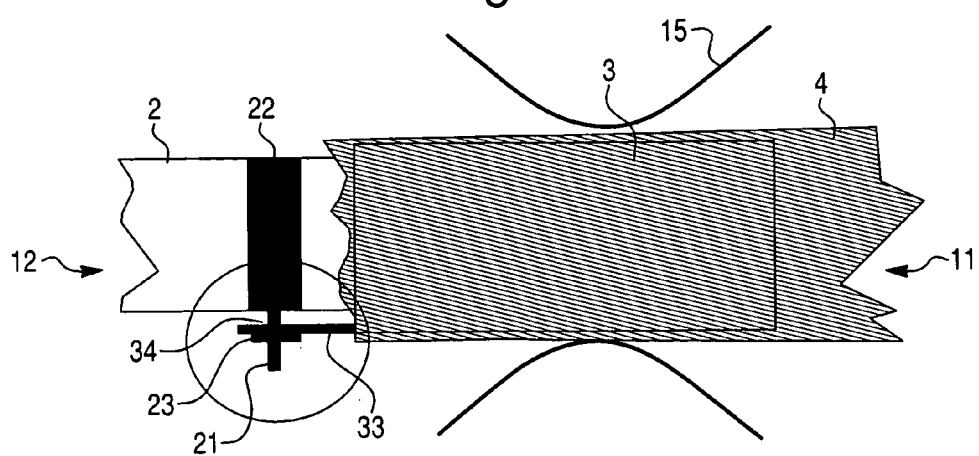
FIG. 3c is a side view of a protective layer connected to a mass flow divider of an airbag module, according to an exemplary embodiment.

FIGS. 3a to 3c show other exemplary embodiments concerning the arrangement of a protective layer 4 in an airbag module. According to FIG. 3a a mass flow divider formed by cylindrical housing 3 partially surrounds a rod-shaped inflator 2 located in connection area 15, connecting two chambers 11, 12 of a gasbag.

The cylindrical housing 3 is provided with an attachment clip 33 comprising a bore hole 34 used to join the attachment clip 33 to a threaded bolt 21 that is a part of a clamp 22 fastened to the inflator 2, connecting the cylindrical housing 3 to the inflator 2. The cylindrical housing 3 is surrounded by the protective layer 4 extending into the first chamber 11 of the gas bag. The protective layer 4 has an attachment portion 41 that is fixed to the threaded bolt 21 via an opening 43. Both the cylindrical housing 3 and the protective layer 4 are secured to the threaded bolt 21 by a nut 23. The inflator 2 can be connected (via the threaded bolt 21) to a holder that is joined to a part of the vehicle body.

According to FIG. 3b, an inflator 2 is connected to a cylindrical housing 3 via a clamp 22 having a threaded bolt 21 that is secured to a clip 33. A protective layer 4 surrounds the cylindrical housing 3 and has one end portion extending into a first chamber 11 of the gasbag. The opposite end portion of the protective layer 4 includes bulges 44 extending into the second chamber 12 of the gasbag. The bulges 44 are connected to portions of the gasbag (located in front of or behind the drawing plane) by at least one seam 16, permitting a safe connection of the protective layer 4 with the gasbag. The bulges 44 are configured to prevent a gas flow from a high pressure chamber 11 to a low pressure chamber 12 of the gasbag to maintain a constant inner pressure in both chambers 11, 12 of the gasbag.

Although in the illustrated example the bulges of the protective layer are sewn to the gasbag, according to other exemplary embodiments other fasteners or fastening methods may be employed to join the bulges to the gasbag (e.g., an adhesive).

According to FIG. 3c, the inflator 2 and cylindrical housing 3 are disposed within the connecting portion 15 of a gasbag having two chambers 11, 12. In contrast to the exemplary embodiments of protective layers shown in FIGS. 3a and 3b, however, the protective layer 4 illustrated in FIG. 3c does not include any specific attachment structures. The protective layer has a hollow-cylindrical shape with an inner diameter adapted to the outer diameter of the cylindrical housing 3 such that the protective layer is clamped to the cylindrical housing 3 when pushed onto the cylindrical housing. Additionally, clamps or strips (not shown) surrounding the cylindrical protective layer 4 may be used to join the protective layer 4 to the cylindrical housing 3.

Figure 4A:
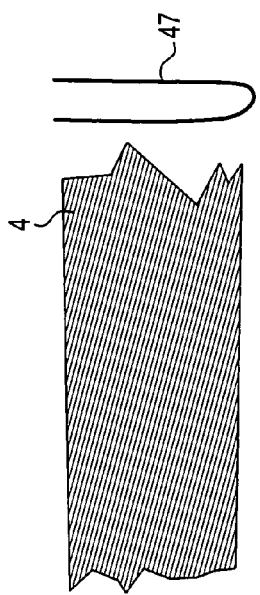
FIG. 4a includes schematic side and cross sectional views of a protective layer, according to an exemplary embodiment.
Figure 4B:
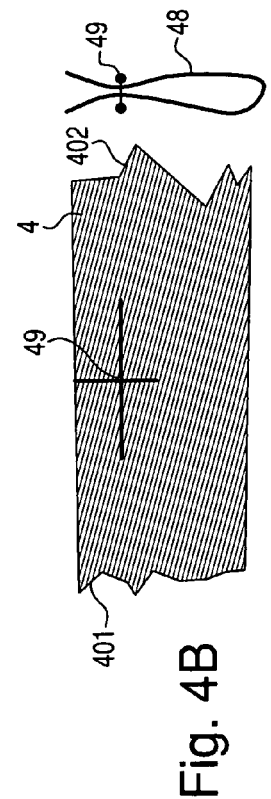
FIG. 4b includes schematic side and cross sectional views of a protective layer, according to another exemplary embodiment.
Figure 4C:
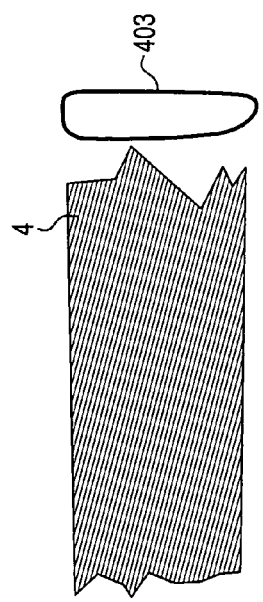
FIG. 4c includes schematic side and cross sectional views of a protective layer, according to another exemplary embodiment.

The FIGS. 4a to 4c illustrate other exemplary embodiments of a protective layer. The protective layer 4 shown in FIG. 4a extends longitudinally and has a U-shaped cross section. The protective layer 4 can be formed from a flat material 47 such as a textile fabric.

Referring to FIG. 4b, the protective layer 4 extends longitudinally, is tubular, and is formed from a textile fabric 48. Opposite sides of the textile fabric 48 are connected with a cross-like seam 49. The cross-like shape of the seam 49 leads to an enhanced flexibility at the end portions 401, 402 of the protective layer 4. This flexibility facilitates the connection of one of the end portions to a mass flow divider. The flexible design of the other end portion of the protective layer 4 that extends into a high pressure chamber (not shown) of the gasbag permits this other end portion to be deformed by the high pressure in such a way that it blocks a backflow of gas from the high pressure chamber into a low pressure chamber.

According to FIG. 4c, a tubular protective layer 4 with a closed cross-section can be produced from a flexible tubular material 403. The diameter of the tubular material 403 can be chosen to fit with the outer diameter of a cylindrical mass flow divider (not shown) permitting the protective layer to be secured to the mass flow divider by clamping without additional fasteners.

Figure 4D:
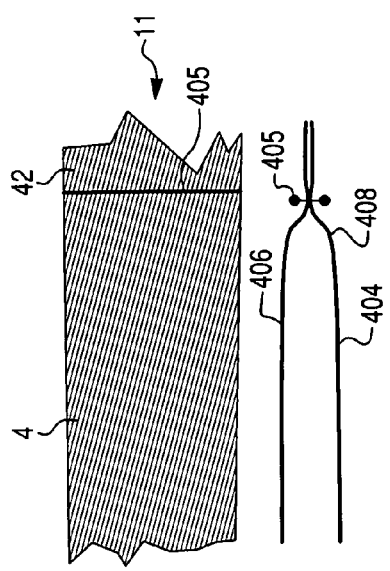
FIG. 4d includes schematic side and top views of a protective layer, according to another exemplary embodiment.
Figure 4E:
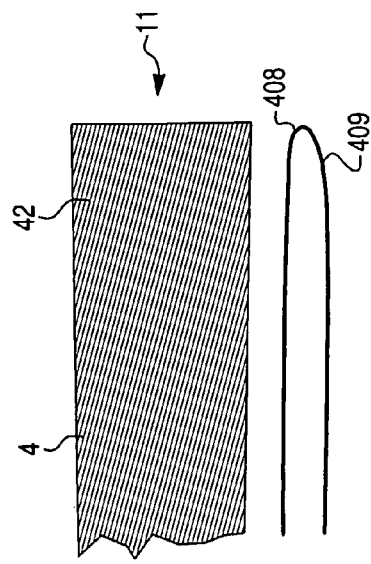
FIG. 4e includes schematic side and top views of a protective layer, according to another exemplary embodiment.
Figure 4F:
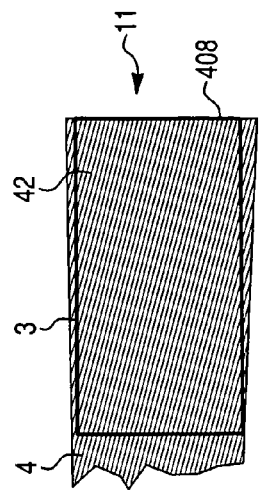
FIG. 4f includes schematic side and top views of a protective layer, according to an exemplary embodiment.

Further exemplary embodiments of protective layers are illustrated in FIGS. 4d to 4f. According to FIG. 4d, a protective layer 4 has a closed end 42 in the high pressure chamber 12 of the gasbag. The protective layer 4 is formed by material layers 404, 406 that are sewn together along a seam 405. The layer 404 has an opening 408 (e.g. formed by a cut) allowing a defined gas flow into the chamber 11. Although the protective layer 4 of FIG. 4d has a single opening 408, according to other exemplary embodiments, multiple openings can be provided to adjust the gas flow into the chamber 11.

According to FIG. 4e, a protective layer 4 includes a closed end 42. The protective layer 4 includes a material layer 409 that is folded to form the closed end 42 located in the high pressure chamber 11 of the gasbag. Similar to the embodiment of FIG. 4d, the closed end 42 includes an opening 408 to define a gas flow into the chamber 11.

Referring to FIG. 4f, a protective layer 4 includes a closed end 42 and is tubular and capable of surrounding the mass flow divider 3. The closed end 42 of the protective layer 4 has outlet openings 408 to permit a predetermined gas flow to be ejected into the chamber 11 of the gasbag.

According to other exemplary embodiments, the closed end of the protective layers shown in FIGS. 4d to 4f may not have any openings. Instead, openings can be provided at different locations of the protective layer, for example outside the high pressure chamber.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An airbag system for a motor vehicle, comprising:
    an inflatable gasbag having at least a first and a second chamber connected to each other along a connecting portion;
    an inflator for inflating the first and second chambers of the gasbag; and
    a mass flow divider associated with the inflator and arranged in the connecting portion of the gasbag such that gas ejected by the inflator is guided into both the first and second chambers of the gasbag by the mass flow divider,
    wherein at least one protective layer extends from the mass flow divider into the first chamber to protect at least a portion of the first chamber from the gas guided into the first chamber by the mass flow divider,
    wherein upon inflation of the gasbag, an inner pressure in the first chamber is significantly higher than an inner pressure in the second chamber,
    wherein the protective layer comprises a flexible material deformed by the inner pressure in the first chamber to prevent gas from flowing from the first chamber through the connecting portion into the second chamber, and
    wherein upon inflation of the gasbag, the inner pressure in the first chamber leads to deformation of the protective layer so that the protective layer closes the connecting portion of the gasbag.

2. The airbag system according to claim 1, wherein the protective layer assists the mass flow divider in guiding the gas into the first chamber.

3. The airbag system according to claim 2, wherein the protective layer prevents gas ejected by the inflator and guided into the first chamber by the mass flow divider from flowing against at least a portion of a covering of the first chamber.

4. The airbag system according to claim 1, wherein the first chamber is at least partially defined by a seam and the protective layer protects at least a portion of the seam from the gas flow guided into the first chamber.

5. The airbag system according to claim 4, wherein the protective layer prevents gas emerging from the inflator and guided into the first chamber by the mass flow divider from flowing against parts of the seam that defines the first chamber of the gasbag.

6. The airbag system according to claim 1, wherein the protective layer comprises a fabric.

7. The airbag system according to claim 1, wherein the protective layer has a U-shaped cross section.

8. The airbag system according to claim 1, wherein the protective layer is formed as a hollow sleeve.

9. The airbag system according to claim 1, wherein the protective layer is tubular.

10. The airbag system according to claim 1, wherein the protective layer comprises a flexible layer, opposite sides of the flexible layer being at least partially connected to form a tubular design.

11. The airbag system according to claim 1, wherein the protective layer comprises two flexible layers at least partially connected to form a tubular design.

12. The airbag system according to claim 1, wherein the protective layer comprises a coating.

13. The airbag system according to claim 12, wherein the protective layer defines an interior surface and an outer surface, the interior surface of the protective layer being provided with the coating.

14. The airbag system according to claim 12, wherein the protective layer defines an interior surface and an outer surface, the exterior surface of the protective layer being provided with the coating.

15. The airbag system according to claim 1, wherein the protective layer is at least partially disposed inside the mass flow divider.

16. The airbag system according to claim 1, wherein the protective layer is disposed outside the mass flow divider.

17. The airbag system according to claim 1, wherein a portion of the protective layer extending into the first chamber has an opening through which gas may pass into the first chamber.

18. The airbag system according to claim 1, wherein a portion of the protective layer extending into the first chamber comprises a closed end.

19. The airbag system according to claim 17, wherein the closed end is formed by sewing or folding the portion of the protective layer extending into the first chamber.

20. The airbag system according to claim 1, wherein the protective layer is connected to the inflator.

21. The airbag system according to claim 20, wherein the protective layer is fastened by a screw or clamp.

22. The airbag system according to claim 1, wherein the protective layer is connected to the mass flow divider.

23. The airbag system according to claim 1, wherein the protective layer is connected to the gasbag.

24. The airbag system according to claim 23, wherein the protective layer is connected to the gasbag by a seam or an adhesive.

25. The airbag system according to claim 1, wherein the protective layer is connected to the connecting portion of the gasbag.

26. The airbag system according to claim 1, wherein the mass flow divider comprises a hollow sleeve.

27. The airbag system according to claim 1, wherein the mass flow divider is tubular.

28. The airbag system according to claim 1, wherein the mass flow divider and the protective layer are two separate parts.

29. The airbag system according to claim 1, wherein the mass flow divider is dimensionally stable.

30. The airbag system according to claim 1, wherein the mass flow divider comprises a substantially rigid material.

31. The airbag system according to claim 1, wherein the mass flow divider comprises a flexible material.

32. The airbag system according to claim 1, wherein the mass flow divider comprises attachment structures permitting a connection to the inflator or another part of the airbag system.

33. The airbag system according to claim 32, wherein the protective layer is connected to the mass flow divider by a seam or an adhesive.

34. The airbag system according to claim 1, wherein the protective layer is bent backwards, thereby closing the connecting portion of the airbag.

* * * * *